US012784008B2

(12) United States Patent
DiGangi et al.

(10) Patent No.: US 12,784,008 B2
(45) Date of Patent: Nov. 3, 2026

(54) ATM DAMAGE ASSESSMENT AFTER ATTACK

(71) Applicant: Wells Fargo Bank, N.A., San Francisco, CA (US)

(72) Inventors: Frank A. DiGangi, Statesville, NC (US); James Merritt Fordham, III, Fort Lauderdale, FL (US); Angel L. Johnson, Las Cruces, NM (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/806,059

(22) Filed: Aug. 15, 2024

(65) Prior Publication Data

US 2026/0050892 A1 Feb. 19, 2026

(51) Int. Cl.
*G06Q 10/20* (2023.01)

(52) U.S. Cl.
CPC .................................... *G06Q 10/20* (2013.01)

(58) Field of Classification Search
CPC ....... G06Q 10/20; G07F 19/207; G07F 19/20; G07F 19/209
See application file for complete search history.

(56) References Cited

U.S. PATENT DOCUMENTS 5,945,602 A * 8/1999 Ross ..................... G07F 19/207 73/570
6,057,646 A 5/2000 Pieroth et al.
9,767,680 B1 * 9/2017 Trundle .................. G06F 11/00
10,137,903 B2 11/2018 Tascione et al.
10,217,329 B1 2/2019 Phillips et al.
10,755,494 B2 8/2020 Venkiteswaran et al.
10,796,537 B1 10/2020 Farivar et al.
10,943,441 B1 3/2021 Watson, III et al.
11,069,050 B1 7/2021 Harvey et al.
11,120,121 B1 * 9/2021 Montenegro ........... G06F 21/45
(Continued)

FOREIGN PATENT DOCUMENTS

BR 102024006746 A2 * 10/2025
CN 106104636 B 1/2020
(Continued)

OTHER PUBLICATIONS

Hossain, M. N., Sayeed, M. S., & Zaman, S. F. U. (2022). Utilizing the Internet of Things, Monitoring and Protecting System for Automated Teller Machines. Asian Journal For Convergence In Technology (AJCT) ISSN-2350-1146, 8(3), 17-21. (Year: 2022).*
(Continued)

*Primary Examiner* — John S. Wasaff
(74) *Attorney, Agent, or Firm* — SCHWEGMAN LUNDBERG & WOESSNER, P.A.

(57) ABSTRACT

Systems and techniques are disclosed for automated damage reporting and repair assessment for automated teller machines (ATMs). An example technique may include detecting damage to an ATM using a sensor. Based on the detected damage, the example technique may include performing a damage assessment and generating a damage report including at least one of a level of damage, a type of damage, a recommended repair action, or an indication to dispatch a technician. The example technique may include outputting the damage report.

20 Claims, 6 Drawing Sheets

(56) References Cited

U.S. PATENT DOCUMENTS

| | | | | |
|---|---|---|---|---|
| 11,514,364 | B2 | 11/2022 | Elisha et al. | |
| 11,688,251 | B1 * | 6/2023 | Hamchuck | G06T 19/006 235/379 |
| 12,087,138 | B2 | 9/2024 | Sheth et al. | |
| 12,125,352 | B2 | 10/2024 | Misra et al. | |
| 12,148,270 | B1 * | 11/2024 | Peng | G07F 19/211 |
| 12,148,271 | B1 | 11/2024 | Singh | |
| 2004/0129772 | A1 * | 7/2004 | Ramachandran | G07F 19/201 235/379 |
| 2004/0204977 | A1 * | 10/2004 | Obert | G06Q 10/063114 705/7.15 |
| 2006/0169764 | A1 * | 8/2006 | Ross | G07F 19/20 235/375 |
| 2009/0299800 | A1 * | 12/2009 | Neilan | G06Q 10/06 709/202 |
| 2010/0214413 | A1 * | 8/2010 | Lin | G07G 3/003 348/150 |
| 2011/0231705 | A1 * | 9/2011 | McGraw, IV | G07F 19/207 714/27 |
| 2018/0033292 | A1 * | 2/2018 | Bhat | G08B 31/00 |
| 2018/0374318 | A1 | 12/2018 | Sanjeevi et al. | |
| 2019/0108734 | A1 * | 4/2019 | Cook | H04N 7/188 |
| 2019/0377449 | A1 * | 12/2019 | Edwards | G06F 3/0412 |
| 2020/0342741 | A1 | 10/2020 | Benkreira et al. | |
| 2020/0388116 | A1 * | 12/2020 | Satanal | G06Q 20/407 |
| 2020/0410824 | A1 | 12/2020 | Bhuvad et al. | |
| 2021/0035101 | A1 | 2/2021 | Pham et al. | |
| 2021/0081917 | A1 * | 3/2021 | Blackford | G07D 11/26 |
| 2021/0232966 | A1 | 7/2021 | Elisha et al. | |
| 2022/0237718 | A1 | 7/2022 | Konrardy et al. | |
| 2022/0321592 | A1 | 10/2022 | Singh | |
| 2023/0012424 | A1 | 1/2023 | Chauhan et al. | |
| 2023/0028010 | A1 | 1/2023 | Pathak et al. | |
| 2023/0105353 | A1 | 4/2023 | Smith et al. | |
| 2024/0296453 | A1 | 9/2024 | Singh et al. | |
| 2024/0330879 | A1 | 10/2024 | Ratcliffe, Jr. et al. | |
| 2025/0054375 | A1 * | 2/2025 | Chesley | G06Q 20/1085 |
| 2026/0051228 | A1 | 2/2026 | Digangi et al. | |

FOREIGN PATENT DOCUMENTS

| | | |
|---|---|---|
| CN | 112868032 A | 5/2021 |
| CN | 109477771 B | 8/2021 |
| CN | 115187261 | 10/2022 |

OTHER PUBLICATIONS

Tripathi, V., Mittal, A., Gangodkar, D., & Kanth, V. (2019). Real time security framework for detecting abnormal events at ATM installations. Journal of Real-time image processing, 16(2), 535-545. (Year: 2019).*

Kapoor, Akash, "Predicting Malfunctioning of ATM Machines in Real-Time with Oracle GoldenGate Stream Analytics", [Online]. Retrieved from the Internet: <https://blogs.oracle.com/dataintegration/post/predicting-malfunctioning-of-atm-machines-in-realtime-with-oracle-goldengate-stream-analytics>, (May 23, 2023), 9 pages.

"U.S. Appl. No. 18/806,069, Non Final Office Action mailed Oct. 22, 2025", 18 pgs.

"U.S. Appl. No. 18/806,069, Corrected Notice of Allowability mailed Apr. 16, 2026", 2 pgs.

"U.S. Appl. No. 18/806,069, Examiner Interview Summary mailed Feb. 10, 2026", 2 pgs.

"U.S. Appl. No. 18/806,069, Notice of Allowance mailed Apr. 7, 2026", 11 pgs.

"U.S. Appl. No. 18/806,069, Response filed Feb. 11, 2026 to Non Final Office Action mailed Oct. 22, 2025", 9 pgs.

* cited by examiner

ATM DAMAGE ASSESSMENT AFTER ATTACK

BACKGROUND

Automated teller machines (ATMs) are widely used for financial transactions, and their reliable operation is crucial for customer convenience and financial institutions. However, ATMs are susceptible to various types of damage, including physical tampering, component malfunctions, and environmental factors.

Traditional methods for ATM damage detection often rely on manual inspections or reactive responses to customer complaints. These methods can be time-consuming, inefficient, and prone to delays in identifying and addressing issues. Manual assessments may also lack the objectivity and consistency needed for accurate damage classification and repair prioritization.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and techniques described herein may be used to automate the detection and reporting of damage to an automated teller machine (ATM). An example technique may include detecting damage through a physical contact sensor or self-diagnostics. The example technique may include performing a damage assessment based on the detected damage and generating a damage report that includes information such as a level of damage, a type of damage, a recommended repair action, or an indication of whether to dispatch a technician. The example technique may include transmitting the damage report to a monitoring system, which can be human-operated or automated. The example technique may include analyzing the report, prioritizing repairs based on urgency, or assigning a technician based on available resources.

Figure 1:
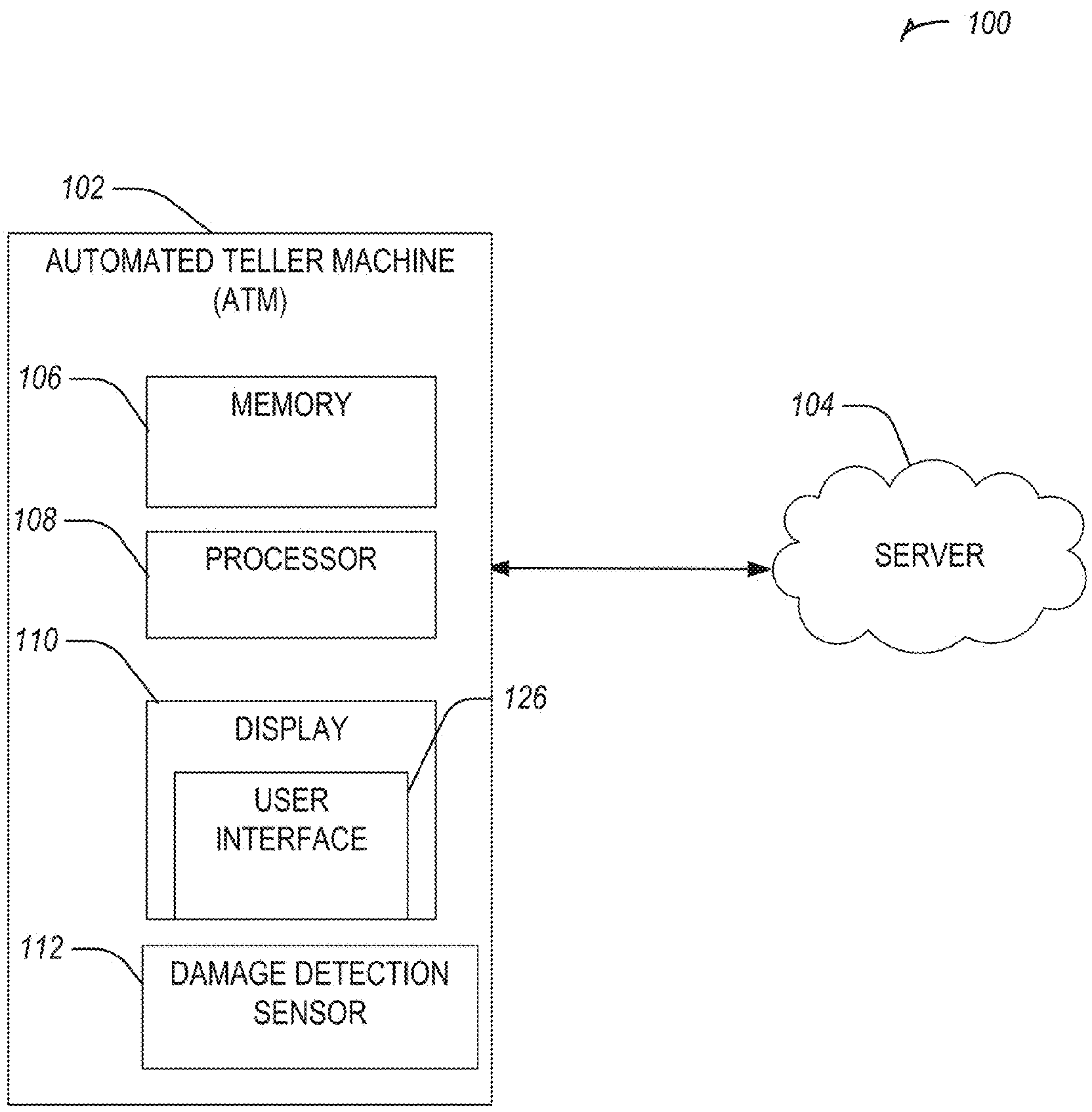
FIG. 1 illustrates a diagram showing components of a damage reporting system in an ATM, according to various examples.

FIG. 1 illustrates a system 100 showing components of a damage reporting system in an ATM. The ATM 102 includes a memory 106, a processor 108, and a display 110 to present a user interface 126. The ATM 102 includes a damage detection sensor 112. The damage detection sensor 112 may include or may be any one or more of a temperature sensor, an accelerometer, a magnetometer, a pressure sensor, a tilt sensor, a microphone, an inertial measurement unit (IMU), a gyroscope, a camera, a hall effect sensor, a force sensor, a capacitive sensor, a humidity sensor, an infrared sensor, a shock sensor, or the like.

A temperature sensor can detect temperature fluctuations, such as when a component overheats. In some examples, a temperature sensor may detect a temperature outside a normal operating range or above or below a threshold, such as due to a malfunctioning processor or power supply, a fire, (e.g., because of arson or an electrical short circuit), or the like.

An accelerometer can detect an excessive vibration or impact (e.g., above a threshold), which may indicate vandalism or an attempt to access an internal portion of the ATM. Such an attempt may include someone kicking or hitting the ATM, use of a crowbar or hammer, a vehicle collision (e.g., intentional or accidental), the ATM falling over (e.g., from a person intentionally or accidentally such as via weather), or the like.

A magnetometer can detect the presence of a magnetic field, for example indicating use of a skimming device or presence of a tool with a strong magnet used in a tampering attempt, for example.

A pressure sensor can detect changes in pressure in a portion of the ATM, for example when tampering with the cash dispenser or a forced entry attempt occurs. In some examples, the pressure sensor may detect whether an object is leaning heavily on the ATM, potentially causing structural damage.

A tilt sensor can detect whether the ATM has been moved or tilted, which may indicate an unauthorized relocation, an attempt to dislodge the machine from its foundation, or a situation where a vehicle is used to break into the ATM or move the ATM.

A microphone can capture noise, which may be compared to a baseline noise inside or outside the ATM. Audio captured by the microphone may be scanned (e.g., continuously or periodically) for an unusual noise such as glass breaking during a forced entry attempt, metal cutting, drilling, a prying sound as someone attempts to open a panel or a cover, or the like.

An IMU may be used to provide more comprehensive data about the ATM's movement and orientation to identify a complex event such as tilting or dropping, which may indicate an attempt to tip the ATM, open the ATM, or remove the ATM from a location.

A gyroscope can be used to detect rotational motion, such as where someone is attempting to manipulate the ATM by rotating a component such as the card reader or cash dispenser.

A camera can be used to capture visual evidence of damage or tampering. In some examples, the camera can record a break in attempt, capture a license plate number, document an extent of physical damage, or the like.

A Hall effect sensor can detect the presence of a magnetic field, such as an unauthorized device or a relative position of a component of the ATM.

A force sensor can detect a sudden impact or a more gradual force, such as a force applied during tampering or when the ATM is being pulled or pushed. A force sensor may detect a force regardless of its acceleration or jerk. A force sensor may output a magnitude or direction of a force.

A capacitive sensor can detect changes in capacitance, which may be used to detect touch within the ATM, or whether an is obstructing the sensor, for example indicating an attempt to block a security measure or an attempt to tamper with a component.

A humidity sensor can monitor moisture within the ATM, for example to prevent damage to electronic components by indicating that humidity is high or water presence, such as from a leak or spill.

An infrared sensor can detect changes in heat, for example indicating a component that is overheating due to a malfunction or an external factor.

A shock sensor may be used to detect a window break-in by sensing vibration or an impact associated with shattering glass. In some examples, a shock sensor may detect a sudden impact like a window smashing or the display 110 of the ATM 102 being forcefully broken, for example during a robbery or vandalism attempt The memory 106 stores data and instructions that are executed by the processor 108. The memory 106 may be implemented using any suitable type of memory, such as volatile memory (e.g., random access memory (RAM), or non-volatile memory (e.g., read-only memory (ROM, flash memory). In some embodiments, the memory 106 may store historical data related to the operation of the ATM 102, such as historical repair data, error logs, or sensor data. For example, the historical repair data may include a record of past repairs made to the ATM, detailing the type of damage, the repair actions taken, the date and time of the repair, or any relevant sensor data that led to the repair. In some examples, this data can be used to identify patterns of damage, predict future maintenance needs, or evaluate the effectiveness of different repair strategies.

The memory may store a log recording specific instances of detected damage, including the type of damage (e.g., physical tampering, hardware malfunction), the severity of the damage, or the time and date of detection. In some examples, the log can be used to track the frequency and nature of damage events, assess the overall security of the ATM, or investigate potential incidents.

The memory may store measurements from the various sensors in the damage detection sensor 112, such as temperature readings, accelerometer data, magnetometer readings, or pressure values. In some examples, this data may include settings or parameters that control the operation of the damage detection system, such as the sensitivity of the damage detection sensor 112, a threshold for generating a damage report, or a communication protocol used to transmit data to the server 104. The memory 106 may store software updates for the damage detection system, which can be downloaded from the server 104 or installed on the ATM 102.

The processor 108 executes the instructions stored in the memory 106. The processor 108 may be implemented using any suitable type of processor. In some examples, the processor 108 may be configured to perform various functions, such as processing or analyzing sensor data from the damage detection sensor 112, and communicating with the server 104. The processor 108 may receive raw data from the damage detection sensor 112, such as temperature readings, accelerometer values, or images from a camera. The processor 108 may process this data, apply filtering, calibration, or another algorithm to extract meaningful information or detect any anomaly that may indicate damage.

In some examples, the processor 108 may analyze the processed or raw sensor data, comparing the sensor data to a specified threshold or pattern. For example, the processor 108 may analyze accelerometer data to detect a physical impact to the ATM 102, compare temperature readings to a predefined threshold to identify an overheating component, process images from a camera, analyze audio data from a microphone, or compare current sensor data with historical data to detect an anomaly. The processor 108 may determine a type or severity of the damage, classifying the damage into a category such as physical tampering, hardware malfunction, or environmental damage. When the damage assessment indicates a potential problem, the processor 108 may generate a damage report. The damage report can be a notification displayed on the ATM screen, a report sent to a remote monitoring system, an alarm, a call or message to emergency services, or the like.

The display 110 enables the user to interact with the ATM 102 and may be implemented using any suitable type of display, such as a light-emitting diode (LED) or a touch screen. The user interface 126 may include an input device, such as a button, a keypad, a touch screen, or the like. In some examples, the user interface 126 may enable a technician to access or review a damage report or log generated by the processor 108 based on the data received from the damage detection sensor 112. In other examples, the user interface 126 may a technician to acknowledge the alert, initiate a repair action, or request further assistance.

In some examples, the temperature sensor 112 may be configured to detect an abnormal temperature fluctuation that may indicate a fire or overheating of an internal component of the ATM 102. The accelerometer 112 may be used to detect an excessive vibration (e.g., above a threshold) or an impact to the ATM 102. Vibration or an impact may indicate vandalism or an attempted break-in or may indicate that the ATM 102 has fallen over or has been tipped at an angle. In an example, the magnetometer 112 can be used to detect the presence of a magnetic field to reveal the use of a skimming device. The pressure sensor 112 can be used to detect changes in pressure around the ATM which may indicate tampering or forced entry. The tilt sensor 112 may be used to determine if the ATM has been moved or tilted. In an example, the microphone 112 can be used to pick up an unusual noise, such as glass breaking or metal cutting which may indicate an attack on the ATM 102.

The data from the damage detection sensor 112 may be analyzed by the processor 108 to determine whether the ATM 102 has sustained damage. When damaged is detected, the processor 108 may generate an alert and transmit it to the server 104. In other examples, the processor 108 may initiate an additional security measure, such as shutting down the ATM 102, disabling cash dispensing, activating an alarm, calling 911, or the like. The processor 108 may generate a detailed damage report, for example including a type or severity of damage, for further analysis or repair scheduling.

In some embodiments, a machine learning model may be trained on a variety of sensor data, such as a vibration sensor reading from the ATM. During training, the model may learn to associate certain patterns of vibrations with different types of damage (e.g., excessive vibrations may indicate a loose internal component). When new vibration data is collected in the prediction phase, the model may analyze the data and determine whether the current vibration pattern indicates damage. In this example, in response to determining that the current vibration pattern indicates damage, the model may output a prediction indicating the damage.

In some examples, the server 104 may be a remote computer that monitors the operation of the ATM 102. The server 104 may be configured to receive an alert from the ATM 102, dispatch a technician to repair the ATM 102, store historical data related to the operation of the ATM 102, or the like. The server 104 may be configured to update the software of the ATM 102. In some examples, the server 104 may be a remote computer that monitors the operation of multiple ATMs, including the ATM 102. In this example, the server 104 may be configured to maintain a centralized database of damage reports or repair logs for all monitored ATMs.

Figure 2:
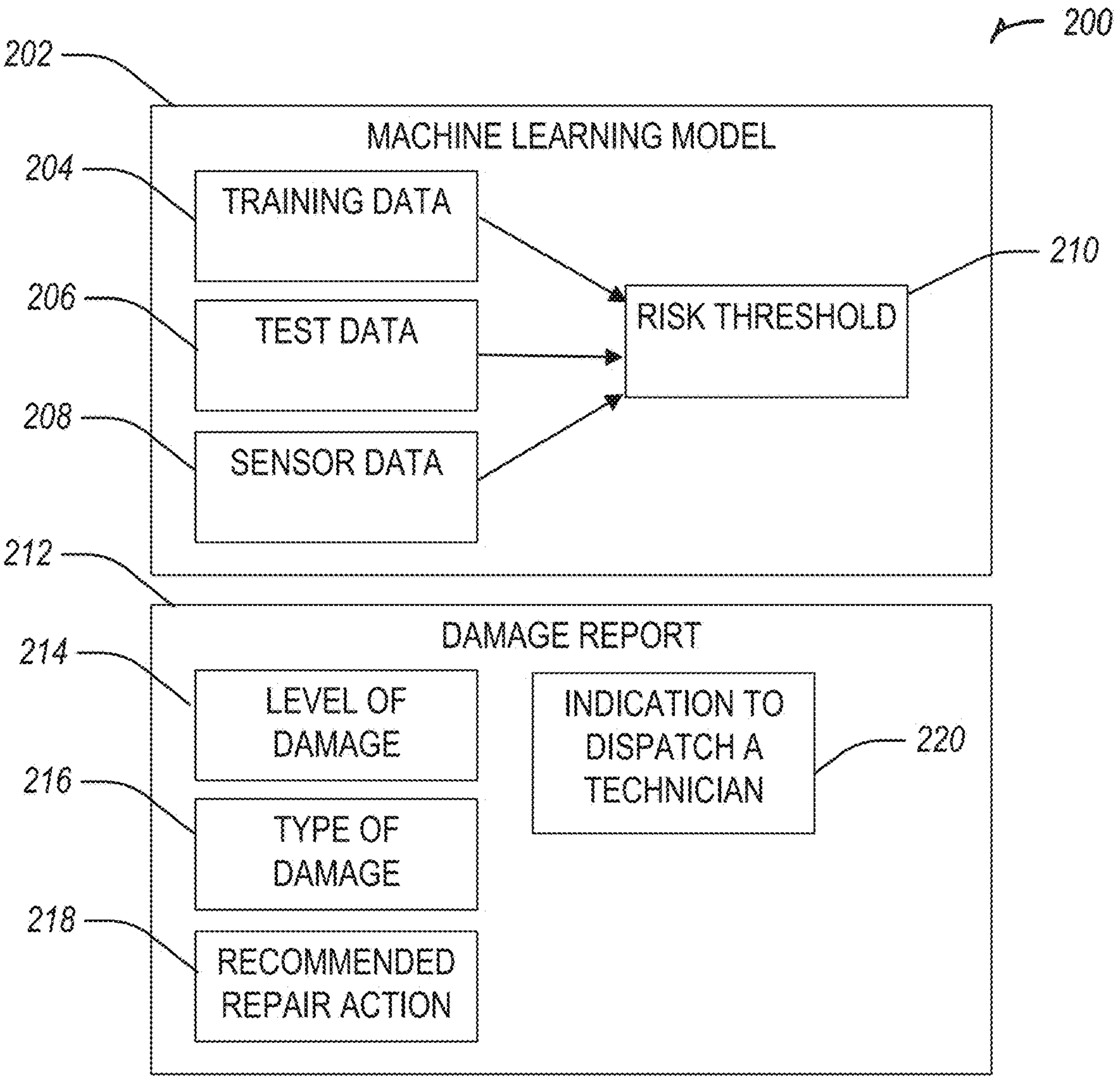
FIG. 2 illustrates a block diagram for damage detection at an ATM, according to various examples.

FIG. 2 illustrates a block diagram 200 for damage detection at an ATM. The block diagram 200 illustrates a machine learning (ML) model 202 and a damage report 212.

The machine learning model 202 may be a trained model designed to analyze sensor data 218 or assess potential damage to the ATM. The training data 204 and test data 206 may be used to develop or refine the model's ability to recognize patterns or abnormalities that may signify different types or levels of damage. For example, the training data 204 may be used to train the model to recognize a pattern or correlation between one or more sensor readings and a specific type of damage.

The test data 206 may serve as an independent dataset used to evaluate the performance of the model 202 after training. The test data 206 may include similar types of sensor data as the training data 204, but with known damage states (e.g., labeled). In some examples, the model 202 may compare a prediction on the test data 206 to actual damage conditions to assess and fine-tune accuracy or reliability.

Based on the analysis, the model 202 may be used to generate a damage report 212 detailing a level of damage 214, a type of damage 216, a recommended repair action 218, or an indication to dispatch a technician 220. In some examples, the damage report 212 may be a summary generated using data from the machine learning model 202, or example, detailing a damage assessment result. It may include information such as a level of damage 214 (e.g., minor, moderate, or severe), a specific type of damage 216 detected (e.g., a hardware malfunction, vandalism, etc.), a recommended repair action 218 to address the issue, an indication to dispatch a technician 230 if the damage exceeds a specified risk threshold 210, or the like. In some examples, the damage report may be displayed to a user or technician via the display of the ATM or transmitted to a remote monitoring system for further action.

The level of damage 214 may indicate the severity of the detected damage. In some examples, the level may be categorized as minor, moderate, or severe, based on a specified threshold or rule established during the training of the machine learning model 202. For example, minor damage may include a cosmetic issue such as a scratch or minor dent. Moderate damage may indicate damage that makes using the ATM inconvenient or more difficult than normal but still functional, such as a malfunctioning keypad or a partially obstructed card reader. Severe damage may include damage that causes the ATM to not function or indicate a break in attempt, such as a broken screen, a jammed cash dispenser, or the like.

The type of damage 216 may include information to specify the nature of the damage, such as physical tampering (e.g., forced entry, vandalism), hardware malfunction (e.g., jammed card reader, broken dispenser), environmental damage (e.g., water ingress, excessive heat), or the like. For example, physical tampering may involve a sign of forced entry, such as a pry mark, a broken lock, or a damaged panel. Vandalism may include graffiti, stickers, or other defacements. Hardware malfunctions may include a jammed card reader or cash dispenser, or a faculty display or internal components failure. Environmental damage may include water damage due to leaks or flooding, excessive heat from direct sunlight exposure, or dust accumulation causing overheating.

The recommended repair action 218 may indicate what repair action is to be taken to resolve the damage, such as cleaning, maintenance replacement of a specific component, ATM replacement, or the like. For example, for a minor issue, the recommended repair action 218 may indicate a cleaning or maintenance action, such as cleaning the card reader or removing an obstruction form the cash dispenser. In cases of moderate damage, replacement of specific components, such as the keypad, display or card reader, may be recommended. For severe damage or complex malfunctions, the recommended repair action 218 may be to replace the ATM or a component of the ATM.

The indication to dispatch a technician 220 may include information to recommend dispatching a technician when the damage is severe or requires specialized expertise. For example, in some cases, the damage may be minor and easily resolved by on-site personnel with minimal training. In other cases where the damage is categorized as severe or requiring specialized expertise, the ATM may send an indication to dispatch a particular type of technician qualified fix the damage.

The specified risk threshold 210 may be used as a benchmark to determine whether the detected damage warrants immediate attention or the dispatch of a technician. The specified risk threshold 210 may be set based on one or more of various factors, such as the type of damage, the level of damage, a location of the ATM, a historical damage or break in at the ATM, or the like. For example, a high risk threshold may be set for detecting signs of forced entry or tampering, while a lower threshold may be applied for minor malfunctions. In some examples, the risk threshold may be adjusted based on the specific security requirements and operational priorities of the ATM network or ATM location. If the detected damage exceeds the specified risk threshold 210, an alert or a detailed damage report may be generated.

Figure 3:
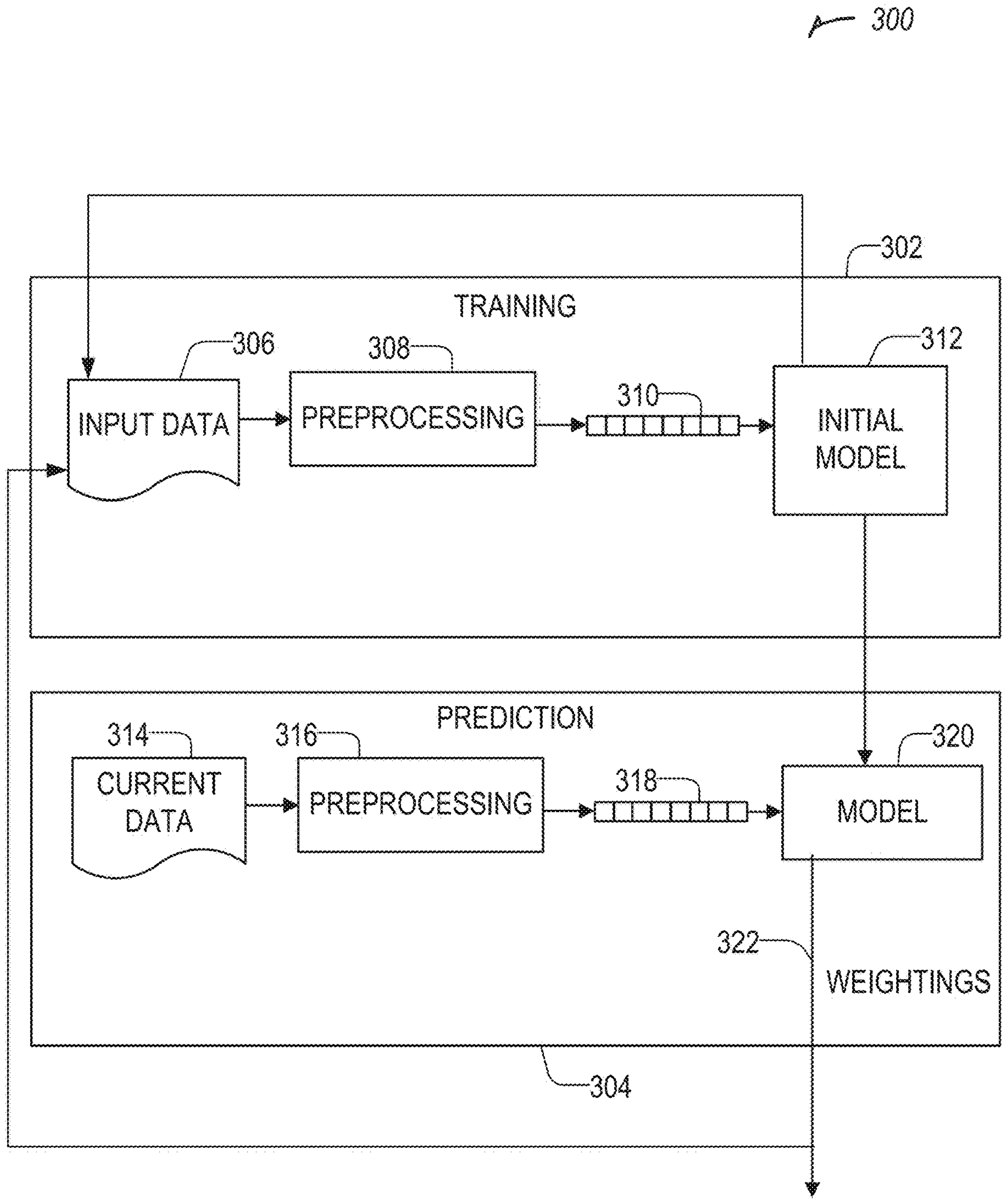
FIG. 3 illustrates a machine learning engine for training and execution related to performing a damage assessment and generating a damage report, according to various examples.

FIG. 3 illustrates a machine learning engine for training and execution related to performing a damage assessment and generating a damage report, according to various examples. The machine learning engine may be deployed to execute at an ATM or a computer. A machine learning system 300 may calculate one or more weightings for criteria based upon one or more machine learning algorithms. FIG. 3 shows an example machine learning system 300 according to some examples of the present disclosure.

The machine learning system 300 includes a training phase 302 and a prediction phase 304. In the training phase 302, input data 306, which may include historical or simulated data representing various ATM conditions, may undergo preprocessing at block 308.

Preprocessing may include cleaning the data, removing outliers, or transforming it into a suitable format for training the machine learning system 300. In an example, the preprocessed data may be used to determine one or more features 310. The one or more features 410 may be used to generate an initial model 312, which may be updated iteratively or with future labeled or unlabeled data (e.g., during reinforcement learning or other further learning). Updating the initial model 312 may include improving performance of the initial model 312 or the training phase 302. An improved model may be redeployed for use, for example at a local device (e.g., an ATM).

The input data 306 may include various types of data collected from the ATM, such as sensor data from an accelerometer, temperature sensor, pressure sensor, or microphone. For example, accelerometer data can be used to detect vibrations or impacts on the ATM, while temperature sensor data can identify abnormal temperature fluctuations that could indicate a fire hazard. The input data 306 may also include historical repair data, such as logs of previous repairs, replacement parts used, or repair times. In some examples, historical repair data can be used to train the model 312 to predict potential future damage based on past events. In other examples, the input data 306 may include environmental data, such as weather conditions or time of day, which could influence the likelihood of certain types of damage.

In the prediction phase 304, current data 314 (e.g., data from a damage sensor of an ATM) may be input to preprocessing block 316 for preprocessing. In some examples, preprocessing component 308 and preprocessing component 316 are the same. The prediction phase 304 produces feature vector 318 from the preprocessed current data, which is input into the model 320 to generate one or more criteria weightings 322. The criteria weightings 322 may be used to output a prediction, as discussed further below.

In some examples, an output of the machine learning system 300 may be compared against a specified risk threshold to determine whether an ATM is likely to have sustained damage or a particular type of damage. When the output exceeds the specified risk threshold, the machine learning system 300 may generate a damage report.

The training engine 302 may operate in an offline manner to train the model 320 (e.g., on a server). The prediction engine 304 may be designed to operate in an online manner (e.g., in real-time, at a mobile device, or on a computer). In some examples, the model 320 may be periodically updated via additional training (e.g., via updated input data 306 or based on labeled or unlabeled data output in the weightings 322) or based on identified future data, such as by using reinforcement learning to personalize a general model (e.g., the initial model 312) to a particular user or ATM.

Labels for the input data 306 may include a category or attribute associated with damage detection sensor data. For example, a label may specify a type of damage (e.g., physical tampering, hardware malfunction, environmental damage), a severity of damage (e.g., minor, moderate, severe), a specific sensor that triggered an alert, or the like. The model 320 may be trained with historical repair data, including information about time to complete a repair, whether a repair was successful, etc.

The initial model 312 may be updated using further input data 306 until a satisfactory model 320 is generated. The model 320 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 302 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 302. In an example embodiment, a regression model is used and the model 320 is a vector of coefficients corresponding to a learned importance for each of the features in the vector of features 310, 318. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained, the model 320 may output a damage type, damage level, damage report, damage indicator, or the like. In some examples, the model 320 may output a recurring pattern associated with a specific ATM location or environmental condition, such as high humidity or extreme temperatures, which may increase the risk of damage. In other examples, the model 320 may output a prediction of the likelihood of future damage, a recommendation for preventive maintenance or repair actions, or an alert indicating a potential security threat. The output can be presented in various forms, such as a numerical score, a categorical label, or a detailed report. The specific output format may be determined by the requirements of the specific ATM or the use of the information, such as a repair technician.

Figure 4:
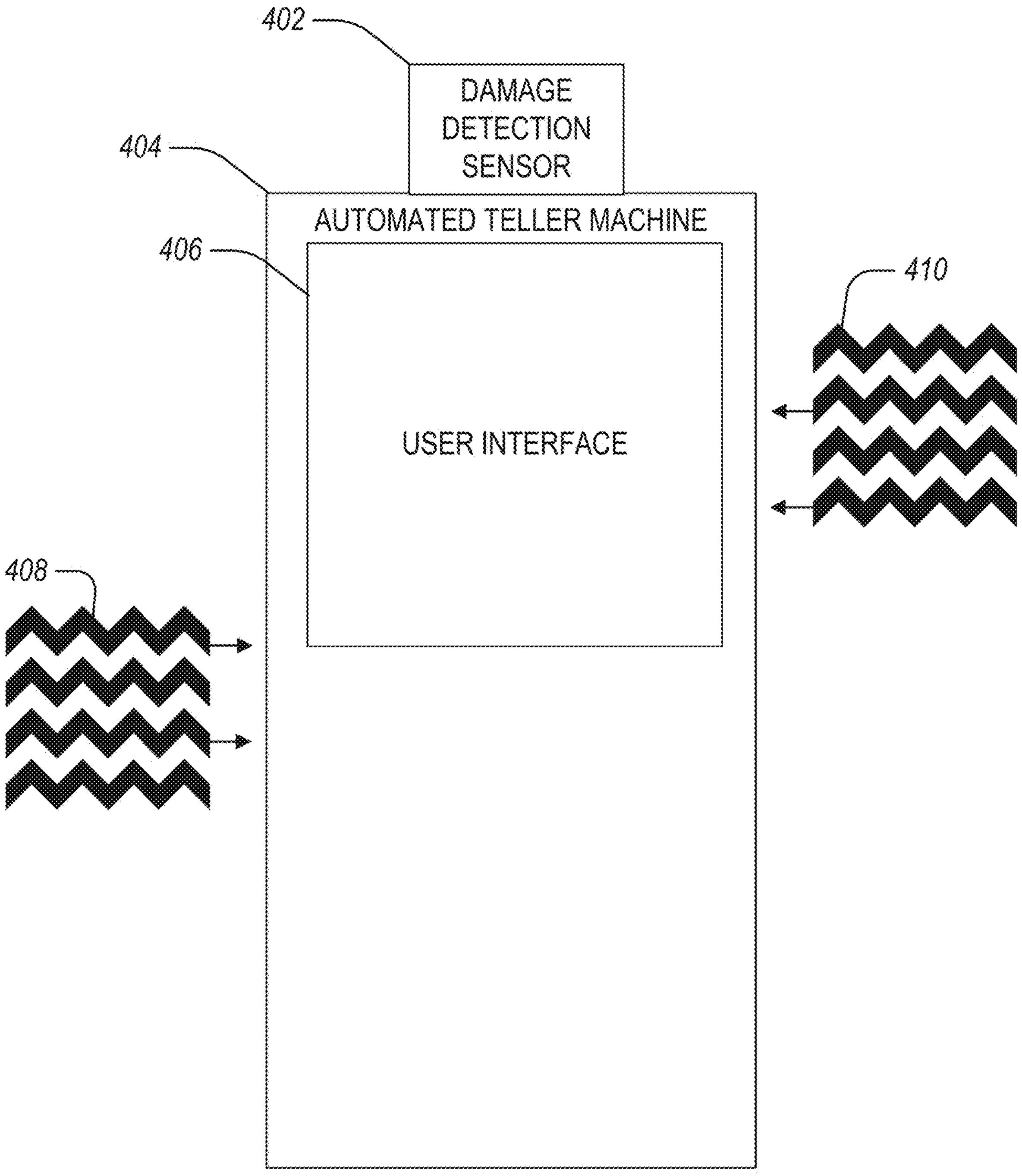
FIG. 4 illustrates an ATM equipped with a damage detection sensor, according to various examples.

FIG. 4 illustrates an ATM 404 equipped with a damage detection sensor 402, according to various examples. The ATM 404 may include a user interface 406. In an example, the damage detection sensor 402 can measure a magnitude or direction of a force, such as force 408 or force 410 acting upon the ATM 404. For example, if an individual attempts to pry open a casing of the ATM 404 or forcefully shake the ATM 404, the damage detection sensor 402 may detect an abnormal force (e.g., 408 or 410).

The damage detection sensor 402 may detect a force associated with a more subtle tampering attempt, such as someone attempting to insert a thin shim or card reader overlay to capture card data. In some examples, the damage detection sensor 402 may output an electrical signal proportional to a detected force, which may be transmitted to processing circuitry of the ATM 404 for further analysis.

In some examples, upon receiving damage detection sensor data, processing circuitry of the ATM 404 may assess the nature or severity of a detected force. When the force exceeds a specified risk threshold such that potential damage or unauthorized access is likely to have occurred, the ATM 404 may generate a damage report. This report may include details about a type of force detected (e.g., impact, shaking, prying), a magnitude of a force detected, a time of a force-based event, a location of the ATM 404, a description of the force-based event, a recommended repair action, an indication to dispatch a technician, or the like. In other examples, the damage report may include additional information, such as images or videos captured by the camera showing the person or object applying the force, or audio recordings from the microphone capturing sounds associated with the event, such as a loud bang or the sound of metal scraping.

In some examples, the generated damage report may be displayed on the user interface 406, which may be a touchscreen display. The user interface 406 may facilitate a technician's ability to assess the situation or initiate repairs or security measures. In an example, the technician can review the damage report, including any accompanying images or videos, to diagnose the problem or determine the appropriate course of action. For example, when the report indicates a forced entry attempt, the technician may be alerted to inspect the ATM 404 for structural damage or review security footage.

In some examples, the damage report may indicate environmental damage, such as water ingress or exposure to extreme temperatures. For example, a humidity sensor within the ATM 404 may detect a sudden increase in moisture levels, suggesting a leak or flooding. If the damage report indicates water damage, the ATM 404 may automatically shut down to prevent electrical shorts or other malfunctions. When the temperature sensor detects excessive heat, the ATM may activate a cooling fan or temporarily shut down to protect internal components. In other examples, the damage report may include details about the environmental conditions that triggered the alert, such as the temperature or humidity level, the duration of the exposure, or the location of the ATM where the environmental conditions were detected.

In some examples, the damage report may indicate a malfunctioning component, such as a jammed cash dispenser or a faulty card reader. In these example, the ATM 404 may automatically take a protective measure to prevent further damage or fraudulent activity. For example, the ATM may disable the malfunctioning component, display an "out of service" message to customers, or log the event in the damage report. The damage report may detail the specific component affected, the nature of the malfunction (e.g., error codes, sensor readings), or the timestamp of the event. In the example, a technician may subsequently be alerted to perform on-site repairs or replacements. The ATM may also sent an alert to the financial institution's central monitoring system to facilitate a quicker response to restore the ATM to full functionality.

In an example, the damage report may suggest a security breach, such as tampering with an internal component or the presence of a skimming device. In response, the ATM 404 may initiate a protective measure. For example, the ATM 404 may automatically shut down to prevent further unauthorized access or transactions, sound an alarm to deter the perpetrator or alert passersby, disable specific functions such as cash dispensing or card reading to safeguard sensitive components or user data, or the like. In some examples, the ATM may capture or store images or videos of the tampering attempt. The ATM may send a silent alarm to law enforcement or on-site security personnel to provide real-time information about an ongoing breach.

Figure 5:
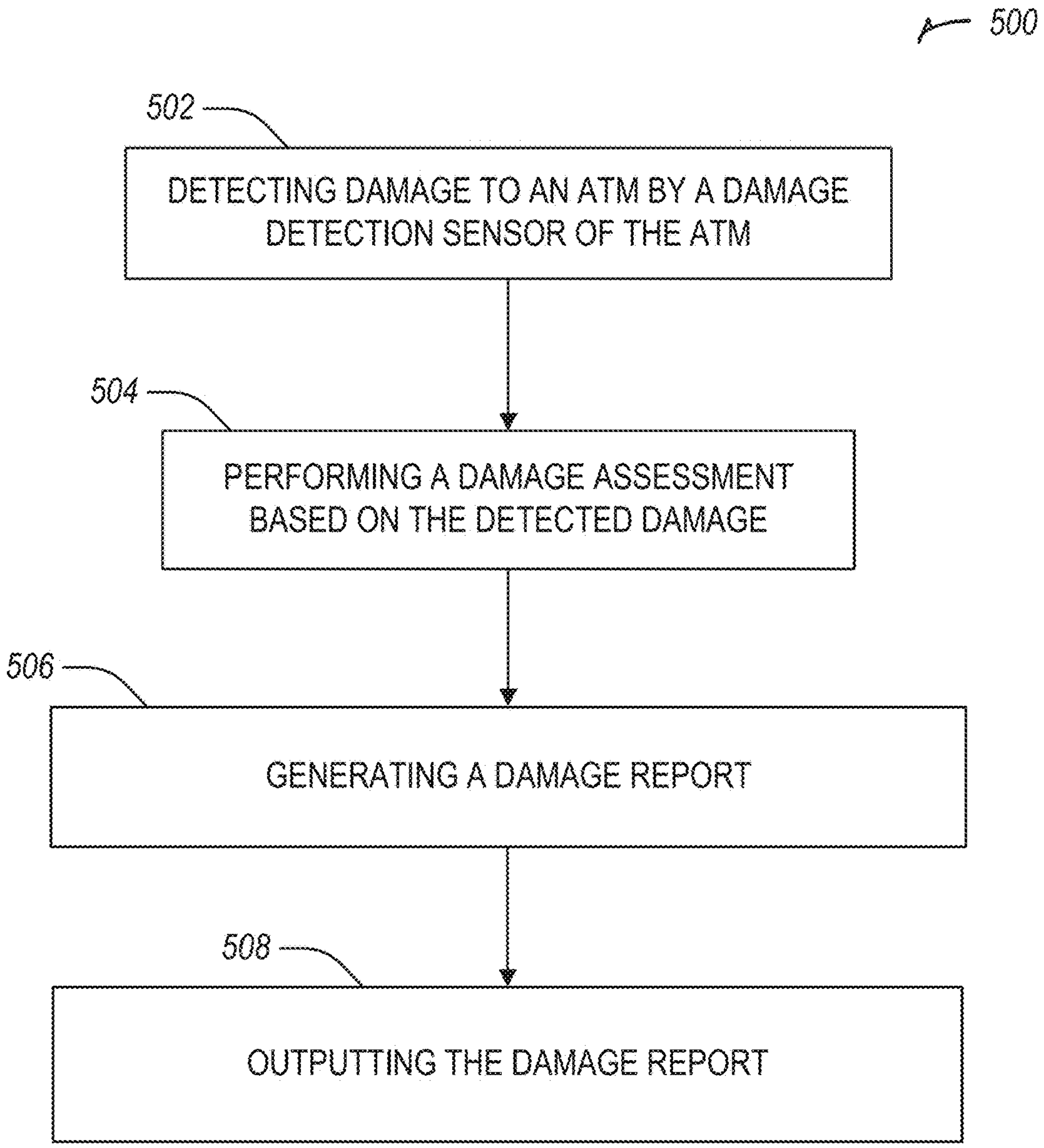
FIG. 5 illustrates a flowchart showing a technique for detecting damage to an ATM and performing a damage assessment, according to various examples.

FIG. 5 illustrates a flowchart showing a technique 500 for detecting damage to an ATM and performing a damage assessment. In an example, the technique 500 may be implemented by a processor of an ATM. In another example, the technique may be implemented by another processing system, such as a server.

The technique 500 includes an operation 502 for detecting damage to an ATM by a damage detection sensor of the ATM. In an example, the damage detection sensor is a temperature sensor, an accelerometer, a magnetometer, a pressure sensor, a tilt sensor, or a sound sensor. In an example, the damage detection sensor may be a combination of two or more of these sensors. The damage detection sensor may be configured to detect various types of damage, such as physical damage or tampering. For example, the temperature sensor may register a sudden spike in heat, indicating a potential fire hazard within the ATM. The accelerometer may detect a strong vibration, suggestive of a forceful impact on the machine, for example from vandalism or an attempted break-in. The magnetometer may detect the presence of an unauthorized magnetic device. The pressure sensor may register abnormal pressure changes around the ATM, which may be indicative of forced entry or tampering with internal components. The tilt sensor may detect if the ATM has been moved or tilted. The sound sensor may pick up unusual noises such as glass breaking or metal screeching which could signify a potential security breach or physical damage.

The technique 500 includes an operation 504 for performing a damage assessment, for example using processing circuitry of the ATM, based on the detected damage. The damage assessment may involve analyzing the data collected by the damage detection sensor to determine a type or severity of the damage. The damage assessment may include comparing the detected damage to a specified risk threshold or pattern to classify the damage or determine whether to output an indication that a technician is needed.

In this operation, the system may analyze the sensor data to determine the nature and extent of the damage. For example, a sudden spike in temperature combined with a loud noise may indicate a fire, while a series of strong vibrations may suggest a sustained attack on the ATM. In some examples, this assessment may be used to classify the damage into specific categories to determine the appropriate response.

The technique 500 includes an operation 506 for generating, for example at the ATM, a damage report. The damage report may include at least one of a level of damage, a type of damage, a recommended repair action, an indication to dispatch a technician, or the like. In some examples, the damage report may be stored in memory of the ATM or transmitted to a remote monitoring system, such as a server. In some examples, the damage report is generated based on the damage assessment performed in operation 404.

The damage report may include additional information, such as a time or date of the damage, a location of the ATM, or relevant sensor data. For example, the damage report may specify whether the damage is minor (e.g., a scratched surface), moderate (e.g., a malfunctioning card reader), or severe (e.g., a broken screen). The damage report may indicate the type of damage, such as "vandalism," "mechanical failure," or "environmental hazard." In other examples, the damage report may include recommendations for repair actions such as "replace card reader."

The technique 500 includes an operation 508 for outputting, for example from the ATM, a damage report. In some examples, the damage report may be output to a display on the ATM, a printer connected to the ATM, or a remote monitoring system, such as a server. The display on the ATM may be a touchscreen display, allowing a user or dispatched technician to interact with the damage report or initiate further actions. The damage report may be used to trigger an action, such as shutting down the ATM or disabling a function of the ATM. For example, when the damage report indicates a severe level of damage, the ATM may be automatically shut down to prevent further damage or unauthorized access. In other examples, the damage report may be used to notify a technician of the damage or the recommended repair action. In some examples, when the damage report is sent to a remote monitoring system, the damage report may trigger an alert to the relevant personnel.

Figure 6:
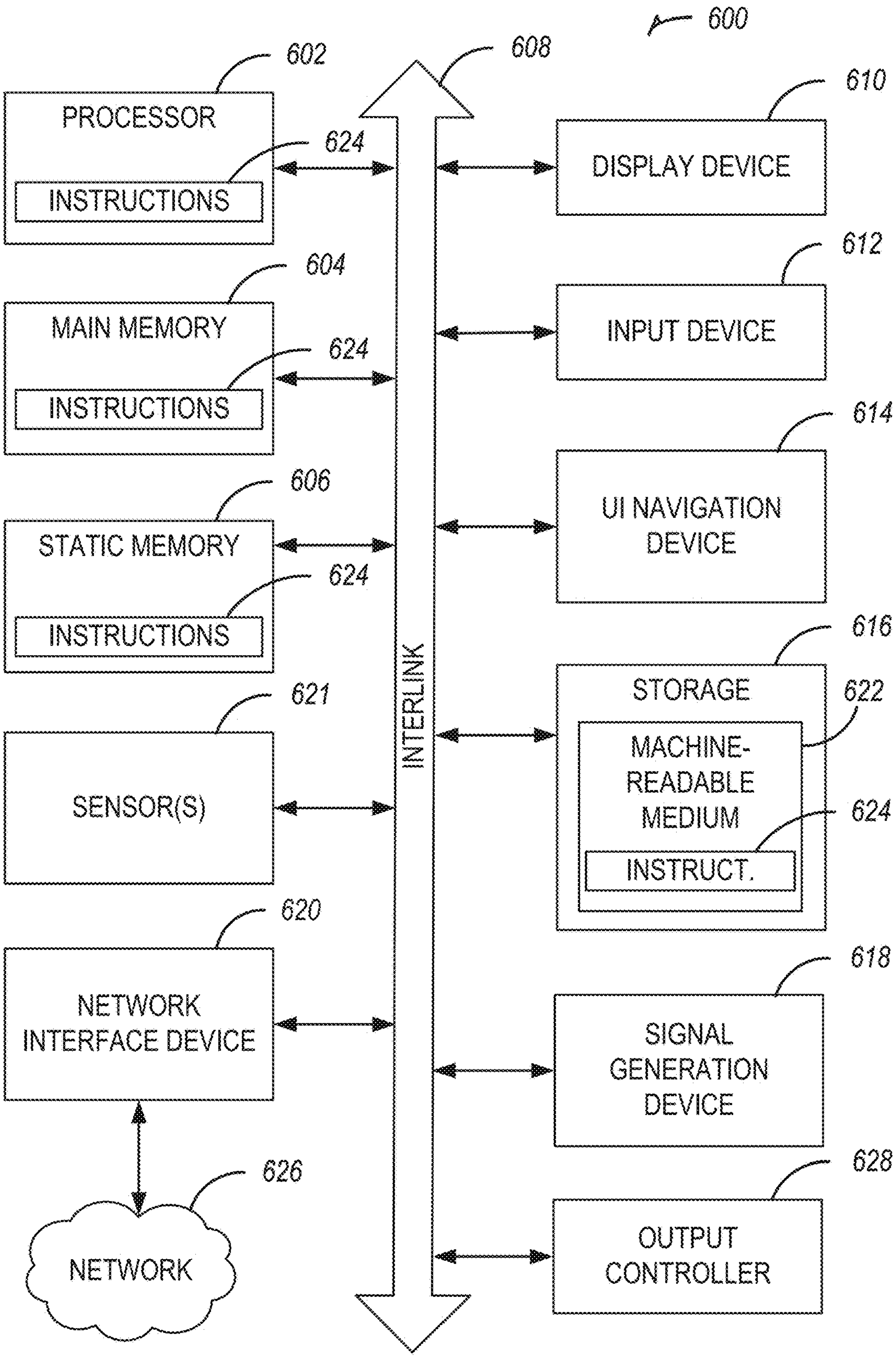
FIG. 6 illustrates generally an example of a block diagram of a machine upon which any one or more of the techniques discussed herein may perform, in accordance with some embodiments.

FIG. 6 illustrates generally an example of a block diagram of a machine upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The following, non-limiting examples, detail certain aspects of the present subject matter to solve the challenges and provide the benefits discussed herein, among others.

Example 1 is a method comprising: detecting damage to an automated teller machine (ATM) by a damage detection sensor of the ATM; performing, using processing circuitry of the ATM, a damage assessment based on the detected damage; generating, at the ATM, a damage report based on the damage assessment, the damage report including at least one of a level of damage, a type of damage, a recommended repair action, or an indication to dispatch a technician; and outputting, from the ATM, the damage report.

In Example 2, the subject matter of Example 1 includes, wherein the damage detection sensor of the ATM includes at least one of a temperature sensor, an accelerometer, a magnetometer, a pressure sensor, a force sensor, a shock sensor, a tilt sensor, a humidity sensor, a microphone, or an infrared sensor.

In Example 3, the subject matter of Examples 1-2 includes, wherein outputting the damage report includes outputting the level of damage, the level of damage including at least one of minor, moderate, or severe.

In Example 4, the subject matter of Examples 1-3 includes, wherein outputting the damage report includes outputting the type of damage, the type of damage including at least one of screen damage, media dispenser malfunction, or physical tampering.

In Example 5, the subject matter of Examples 1-4 includes, wherein the damage report includes the indication to dispatch the technician based on the level of damage exceeding a first specified risk threshold or the type of damage exceeding a second specified risk threshold, and wherein the first and second specified risk thresholds are independently configurable.

In Example 6, the subject matter of Examples 1-5 includes, wherein the damage detection sensor is further configured to monitor environmental conditions external to the ATM.

In Example 7, the subject matter of Examples 1-6 includes, wherein outputting the damage report includes outputting the recommended repair action, the recommended repair action including at least one of replacement of the ATM, recalibration of the ATM, or cleaning of the ATM.

In Example 8, the subject matter of Examples 1-7 includes, wherein the damage report further includes a unique identifier for the ATM.

Example 9 is at least one non-transitory machine-readable medium including instructions, which when executed by processing circuitry of an automated teller machine (ATM), cause the processing circuitry to perform operations to: detect damage to the ATM by a damage detection sensor; perform a damage assessment based on the detected damage; generate a damage report based on the damage assessment, the damage report including at least one of a level of damage, a type of damage, a recommended repair action, or an indication to dispatch a technician; and output, from the ATM, the damage report.

In Example 10, the subject matter of Example 9 includes, wherein the damage detection sensor of the ATM includes at least one of a temperature sensor, an accelerometer, a magnetometer, a pressure sensor, a force sensor, a sunlight sensor, a shock sensor, a tilt sensor, a humidity sensor, a sound sensor, or an infrared sensor.

In Example 11, the subject matter of Examples 9-10 includes, wherein to output the damage report, the instructions further cause the processing circuitry to output the type of damage, the type of damage including at least one of screen damage, media dispenser malfunction, or physical tampering.

In Example 12, the subject matter of Examples 9-11 includes, wherein the damage detection sensor is further configured to monitor environmental conditions external to the ATM.

In Example 13, the subject matter of Examples 9-12 includes, wherein to output the damage report, the instructions further cause the processing circuitry to output a unique identifier for the ATM.

In Example 14, the subject matter of Examples 9-13 includes, wherein to perform the damage assessment, the instructions further cause the processing circuitry to: access historical repair data of the ATM; calculate a remaining lifespan metric for the ATM based on the historical repair data; and include an indication to dispatch a technician in the damage report when the remaining lifespan metric falls below a specified threshold.

In Example 15, the subject matter of Examples 9-14 includes, wherein the damage report further includes a timestamp of when the damage was detected.

In Example 16, the subject matter of Examples 9-15 includes, wherein the instructions further cause the processing circuitry to identify at least one set of potential repair actions based on the type of damage and the level of damage, and select from the plurality of potential repair actions based on a specified criteria, the specified criteria corresponding to availability of at least one of a replacement part, a tool, or an available technician.

Example 17 is an automated teller machine (ATM) comprising: a damage detection sensor to detect damage to the ATM; processing circuitry; and memory, including instructions, which when executed by the processing circuitry, causes the processing circuitry to: perform a damage assessment based on the detected damage; generate a damage report based on the damage assessment, the damage report including at least one of a level of damage, a type of damage, a recommended repair action, or an indication to dispatch a technician; and output, from the ATM, the damage report.

In Example 18, the subject matter of Example 17 includes, wherein the ATM further comprises a long-term storage including historical repair data for the ATM.

In Example 19, the subject matter of Examples 17-18 includes, wherein the damage detection sensor is configured to detect physical contact with the ATM or to monitor at least one internal component of the ATM.

In Example 20, the subject matter of Examples 17-19 includes, wherein the damage report further comprises an indication of a prioritized recommended repair action and an assigned technician based on the level of damage or the type of damage.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. In an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:

detecting damage to an automated teller machine (ATM) by a damage detection sensor of the ATM;

performing, using processing circuitry of the ATM, a damage assessment based on the detected damage by:

processing data from a plurality of sensors of the ATM, the plurality of sensors including at least a first sensor of a first type and a second sensor of a second type, the first type and the second type being different sensor types, wherein the data relates to one of a potential malfunction of the ATM, a potential security breach of the ATM, or potential damage to the ATM; and determining a type and a severity of the damage to the ATM based on analyzing the data by sensor type of the plurality of sensors, wherein:

processing the data comprises comparing the data from the first sensor against a first baseline associated with the first type and comparing the data from the second sensor against a second baseline associated with the second type; and analyzing the data by sensor type comprises detecting a temporal correlation between a deviation from the first baseline by the data from the first sensor and a deviation from the second baseline by the data from the second sensor within a specified time window to distinguish between at least physical tampering, environmental damage, and hardware malfunction;

generating, at the ATM, a damage report based on the damage assessment, the damage report including the type of the damage and at least one of the severity of the damage, a recommended repair action, or an indication to dispatch a technician;

outputting, from the ATM, the damage report;

automatically selecting, using the processing circuitry of the ATM, a security measure from a plurality of security measures based on a combination of the type and the severity of the damage in the damage report; and in response to the selection, activating, by the ATM, the selected security measure by transmitting a control signal from the processing circuitry to a corresponding physical component of the ATM to change an operational state of the ATM, wherein the control signal controls the ATM to perform one of shutting down a component associated with the potential malfunction, sending a signal associated with the potential security breach, or shutting down a component associated with the potential damage.

2. The method of claim 1, wherein the damage detection sensor of the ATM includes at least one of a temperature sensor, an accelerometer, a magnetometer, a pressure sensor, a force sensor, a shock sensor, a tilt sensor, a humidity sensor, a microphone, or an infrared sensor.

3. The method of claim 1, wherein the severity of the damage includes at least one of minor, moderate, or severe.

4. The method of claim 1, wherein outputting the damage report includes outputting the type of damage, the type of damage including at least one of screen damage, media dispenser malfunction, or physical tampering.

5. The method of claim 1, wherein the damage report includes the indication to dispatch the technician based on the severity of the damage exceeding a first specified risk threshold or the type of damage exceeding a second specified risk threshold, and wherein the first and second specified risk thresholds are independently configurable.

6. The method of claim 1, wherein the damage detection sensor is further configured to monitor environmental conditions external to the ATM.

7. The method of claim 1, wherein outputting the damage report includes outputting the recommended repair action, the recommended repair action including at least one of replacement of the ATM, recalibration of the ATM, or cleaning of the ATM.

8. The method of claim 1, wherein the damage report further includes a unique identifier for the ATM.

9. At least one non-transitory machine-readable medium including instructions, which when executed by processing circuitry of an automated teller machine (ATM), cause the processing circuitry to perform operations to:

detect damage to the ATM by a damage detection sensor;

perform a damage assessment based on the detected damage by performing operations to:

process data from a plurality of sensors of the ATM, the plurality of sensors including at least a first sensor of a first type and a second sensor of a second type, the first type and the second type being different sensor types, wherein the data relates to one of a potential malfunction of the ATM, a potential security breach of the ATM, or potential damage to the ATM; and determine a type and a severity of the damage to the ATM based on analyzing the data by sensor type of the plurality of sensors, wherein:

processing the data comprises comparing the data from the first sensor against a first baseline associated with the first type and comparing the data from the second sensor against a second baseline associated with the second type; and analyzing the data by sensor type comprises detecting a temporal correlation between a deviation from the first baseline by the data from the first sensor and a deviation from the second baseline by the data from the second sensor within a specified time window to distinguish between at least physical tampering, environmental damage, and hardware malfunction;

generate a damage report based on the damage assessment, the damage report including at the type of the damage and least one of the severity of the damage, a recommended repair action, or an indication to dispatch a technician;

output, from the ATM, the damage report;

automatically select a security measure from a plurality of security measures based on a combination of the type and the severity of the damage in the damage report; and in response to the selection, activate, by the ATM, the selected security measure by transmitting a control signal from the processing circuitry to a corresponding physical component of the ATM to change an operational state of the ATM, wherein the control signal controls the ATM to perform one of shutting down a component associated with the potential malfunction, sending a signal associated with the potential security breach, or shutting down a component associated with the potential damage.

10. The at least one machine-readable medium of claim 9, wherein the damage detection sensor of the ATM includes at least one of a temperature sensor, an accelerometer, a magnetometer, a pressure sensor, a force sensor, a sunlight sensor, a shock sensor, a tilt sensor, a humidity sensor, a sound sensor, or an infrared sensor.

11. The at least one machine-readable medium of claim 9, wherein to output the damage report, the instructions further cause the processing circuitry to output the type of damage, the type of damage including at least one of screen damage, media dispenser malfunction, or physical tampering.

12. The at least one machine-readable medium of claim 9, wherein the damage detection sensor is further configured to monitor environmental conditions external to the ATM.

13. The at least one machine-readable medium of claim 9, wherein to output the damage report, the instructions further cause the processing circuitry to output a unique identifier for the ATM.

14. The at least one machine-readable medium of claim 9, wherein to perform the damage assessment, the instructions further cause the processing circuitry to:

access historical repair data of the ATM;

calculate a remaining lifespan metric for the ATM based on the historical repair data; and include an indication to dispatch a technician in the damage report when the remaining lifespan metric falls below a specified threshold.

15. The at least one machine-readable medium of claim 9, wherein the damage report further includes a timestamp of when the damage was detected.

16. The at least one machine-readable medium of claim 9, wherein the instructions further cause the processing circuitry to identify at least one set of potential repair actions based on the type of damage and the severity of the damage, and select from the at least one set of potential repair actions based on a specified criteria, the specified criteria corresponding to availability of at least one of a replacement part, a tool, or an available technician.

17. An automated teller machine (ATM) comprising:

a damage detection sensor to detect damage to the ATM;

processing circuitry; and memory, including instructions, which when executed by the processing circuitry, causes the processing circuitry to:

perform a damage assessment based on the detected damage by:

process data from a plurality of sensors of the ATM, the plurality of sensors including at least a first sensor of a first type and a second sensor of a second type, the first type and the second type being different sensor types, wherein the data relates to one of a potential malfunction of the ATM, a potential security breach of the ATM, or potential damage to the ATM; and determine a type and a severity of the damage to the ATM based on analyzing the data by sensor type of the plurality of sensors, wherein:

processing the data comprises comparing the data from the first sensor against a first baseline associated with the first type and comparing the data from the second sensor against a second baseline associated with the second type; and analyzing the data by sensor type comprises detecting a temporal correlation between a deviation from the first baseline by the data from the first sensor and a deviation from the second baseline by the data from the second sensor within a specified time window to distinguish between at least physical tampering, environmental damage, and hardware malfunction;

generate a damage report based on the damage assessment, the damage report including the type of the damage and at least one of the severity of the damage, a recommended repair action, or an indication to dispatch a technician;

output, from the ATM, the damage report;

automatically select a security measure from a plurality of security measures based on a combination of the type and the severity of the damage in the damage report; and in response to the selection, activate, by the ATM, the selected security measure by transmitting a control signal from the processing circuitry to a corresponding physical component of the ATM to change an operational state of the ATM, wherein the control signal controls the ATM to perform one of shutting down a component associated with the potential malfunction, sending a signal associated with the potential security breach, or shutting down a component associated with the potential damage.

18. The ATM of claim 17, wherein the ATM further comprises a long-term storage including historical repair data for the ATM.

19. The ATM of claim 17, wherein the damage detection sensor is configured to detect physical contact with the ATM or to monitor at least one internal component of the ATM.

20. The ATM of claim 17, wherein the damage report further comprises an indication of a prioritized recommended repair action and an assigned technician based on the severity of the damage or the type of damage.

* * * * *